US009300102B2

(12) United States Patent
Ayabakan et al.

(10) Patent No.: US 9,300,102 B2
(45) Date of Patent: Mar. 29, 2016

(54) CRIMPING PRESS

(71) Applicant: SCHLEUNIGER HOLDING AG, Thun (CH)

(72) Inventors: Mustafa Ayabakan, Wuppertal (DE); Thomas Wortmann, Remscheid (DE)

(73) Assignee: SCHLEUNIGER HOLDING AG, Thun (CH)

( * ) Notice: Subject to any disclaimer, the term of this patent is extended or adjusted under 35 U.S.C. 154(b) by 483 days.

(21) Appl. No.: 13/650,150

(22) Filed: Oct. 12, 2012

(65) Prior Publication Data

US 2013/0055563 A1 Mar. 7, 2013

Related U.S. Application Data

(63) Continuation-in-part of application No. PCT/IB2011/051576, filed on Apr. 12, 2011.

(30) Foreign Application Priority Data

Apr. 13, 2010 (CH) .................................... 0530/10
Apr. 19, 2010 (EP) .................................... 10160378

(51) Int. Cl.
*B23P 19/00* (2006.01)
*H01R 43/042* (2006.01)
*H01R 43/048* (2006.01)

(52) U.S. Cl.
CPC ......... *H01R 43/048* (2013.01); *Y10T 29/53235* (2015.01)

(58) Field of Classification Search
CPC .... H01R 43/048; H01R 43/055; H01R 43/00; H01R 43/042; B23P 19/00; B21J 11/00
USPC ....................... 29/753, 749, 750, 751; 72/404
See application file for complete search history.

(56) References Cited

U.S. PATENT DOCUMENTS 3,955,044 A * 5/1976 Hoffman et al. ............ 174/84 C
4,285,228 A * 8/1981 Gunning ......................... 72/402
4,534,107 A * 8/1985 Maack ............................ 29/751
4,576,032 A * 3/1986 Maack et al. ................... 72/431

(Continued)

FOREIGN PATENT DOCUMENTS

DE 8805338 U1 6/1988
DE 4040410 C1 11/1991

(Continued)

OTHER PUBLICATIONS

International Search Report and written opinion, dated Jun. 29, 2011, from parent International Application PCT/IB2011/051576 published as WO2011/128844A1 on Oct. 29, 2011, with English translation.

(Continued)

*Primary Examiner* — Paul D Kim
(74) *Attorney, Agent, or Firm* — George Kapsalas; Patentbuero Paul Rosenich AG

(57) ABSTRACT

Crimping presses that include a frame with a first crimping tool, and a press carriage with a second crimping tool. A bias applicator applies prebiasing initial force acting at least codirectionally to crimping force reaction that is separatory to the first and second crimping tools. The prebiasing initial force acts prior to crimping engagement of the crimping tools. The bias applicator is situated between holders.

9 Claims, 7 Drawing Sheets

(56) References Cited

U.S. PATENT DOCUMENTS

| | | | | | |
|---|---|---|---|---|---|
| 4,805,278 | A | * | 2/1989 | Bulanda et al. | 29/33 M |
| 4,812,138 | A | * | 3/1989 | Kondo et al. | 439/865 |
| 4,828,516 | A | * | 5/1989 | Shaffer | 439/877 |
| 4,829,804 | A | * | 5/1989 | Strobel | 72/391.2 |
| 4,896,419 | A | * | 1/1990 | Jurgenhake et al. | 29/861 |
| 4,914,602 | A | * | 4/1990 | Abe et al. | 702/35 |
| 4,964,200 | A | * | 10/1990 | Giesbrecht et al. | 29/33 M |
| 4,970,889 | A | * | 11/1990 | Phillips et al. | 72/446 |
| 5,038,461 | A | * | 8/1991 | Cerda | 29/753 |
| 5,092,026 | A | * | 3/1992 | Klemmer et al. | 29/593 |
| 5,101,651 | A | * | 4/1992 | Yeomans | 72/21.4 |
| 5,105,648 | A | * | 4/1992 | Steiner et al. | 72/409.08 |
| 5,123,165 | A | * | 6/1992 | Strong et al. | 29/861 |
| 5,197,186 | A | * | 3/1993 | Strong et al. | 29/863 |
| 5,271,254 | A | * | 12/1993 | Gloe et al. | 72/13.2 |
| 5,275,032 | A | * | 1/1994 | Gloe et al. | 72/19.8 |
| 5,307,432 | A | * | 4/1994 | Chin et al. | 385/81 |
| 5,417,461 | A | * | 5/1995 | Dougherty et al. | 285/256 |
| 5,727,409 | A | * | 3/1998 | Inoue et al. | 72/21.1 |
| 5,841,675 | A | * | 11/1998 | Ngo | 702/135 |
| 5,845,528 | A | * | 12/1998 | Wollermann | 72/451 |
| 5,887,469 | A | * | 3/1999 | Maeda et al. | 72/20.1 |
| 5,920,975 | A | * | 7/1999 | Morales | 29/282 |
| 5,921,125 | A | * | 7/1999 | Inoue et al. | 72/20.2 |
| 5,937,505 | A | * | 8/1999 | Strong et al. | 29/593 |
| 6,047,579 | A | * | 4/2000 | Schmitz | 72/15.1 |
| 6,067,828 | A | * | 5/2000 | Bucher et al. | 72/21.4 |
| 6,119,502 | A | * | 9/2000 | Buchmayer | 72/404 |
| 6,161,407 | A | * | 12/2000 | Meisser | 72/21.4 |
| 6,212,924 | B1 | | 4/2001 | Meisser | |
| 6,301,777 | B1 | * | 10/2001 | Sigler et al. | 29/753 |
| 6,418,769 | B1 | * | 7/2002 | Schreiner | 72/21.4 |
| 6,527,016 | B2 | * | 3/2003 | Todaro | 140/92.93 |
| 6,606,891 | B1 | * | 8/2003 | McGowan et al. | 72/21.4 |
| 6,819,116 | B2 | * | 11/2004 | Ishibashi et al. | 324/538 |
| 7,305,758 | B2 | * | 12/2007 | Kurooka et al. | 29/753 |
| 8,079,242 | B2 | * | 12/2011 | Pacaud et al. | 72/21.4 |
| 8,336,351 | B2 | * | 12/2012 | Handel et al. | 72/21.4 |
| 8,671,559 | B2 | * | 3/2014 | Kleber | 29/753 |
| 2001/0025412 | A1 | * | 10/2001 | Burger | 29/748 |
| 2010/0139351 | A1 | * | 6/2010 | Bruhin | 72/21.4 |
| 2012/0137486 | A1 | * | 6/2012 | Charlton et al. | 29/407.01 |

FOREIGN PATENT DOCUMENTS

| | | | |
|---|---|---|---|
| DE | 4337796 | A1 | 5/1995 |
| DE | 19622390 | A1 | 12/1996 |
| EP | 0332814 | A2 | 9/1989 |
| EP | 0291329 | B1 | 1/1994 |
| EP | 1143579 | A1 | 10/2001 |
| EP | 1291984 | A1 | 3/2003 |
| WO | 2011/128844 | A1 | 10/2011 |

OTHER PUBLICATIONS

EPO search report and written opinion from priority EPO application EP10160378, dated Mar. 3, 2011, in German.

* cited by examiner

CRIMPING PRESS

This application is a Continuation-In-Part (CIP) of copending PCT International application no. PCT/IB2011/051576 filed on Apr. 12, 2011 and published as WO2011/128844A1 on Oct. 20, 2011, which in turn claims benefit of priority to prior Swiss national application CH 00530/10 filed on Apr. 13, 2010 and also to prior European (EPO) application 10160378 filed on Apr. 19, 2010; the entirety of parent PCT International application no. PCT/IB2011/051576 is hereby expressly incorporated herein by reference, in its entirety and as to all its parts, for all intents and purposes, as if set forth identically in full herein.

The invention relates to a crimping press that typically includes a first crimping tool, a second crimping tool movable relative to the first crimping tool, and a drive for applying a crimping force between the first and second crimping tools during a crimp production process.

Crimping, which is a specific type of flanging, may be understood as a joining process in which a wire or a cable is connected to a contact that is often in the form of a plug, by means of plastic deformation. The resultant non-releasable connection between conductor and contact ensures a high level of electrical and mechanical reliability and therefore constitutes an alternative to conventional connections, such as soldering or welding. A very common field of use for crimping can therefore be found in electrical engineering (for example HF electronics, telecommunications, automotive electrics).

The crimping connection is produced by applied pressure, wherein crimping profiles matched exactly to the connection part and the conductor cross-section cause a precisely predefined deformation of connection element and conductor. This process is generally carried out with the aid of special crimping pincers or a crimping press. Whereas crimping pincers are generally of relatively simple structure, the structure of crimping presses is comparatively complex. An unfinished workpiece, that is to say a wire or cable normally already having its strands bared, is placed into the crimping claw of the contact in the press. The contact is then pressed together with the wire or cable in the tool of the crimping press. A punch presses against this tool to produce the pressure required for the crimping process.

For example, U.S. Pat. No. 4,805,278 A1 discloses a crimping press for this purpose. This crimping press has a crimping tool and a separating tool, the crimping tool being biased by a spring so as to hold the cable and the crimp in position for the actual crimping process.

European patent publication no. EP0332814A2 further discloses a crimping press in which two jaws spread apart from one another by spring force are arranged in the main body of the tool. These jaws are initially driven together by the ram, the wire being trapped therebetween. The part carrying the jaws is then moved downward by the ram, and the wire trapped by the jaws is placed into the crimping claw.

In order to obtain an optimal crimp connection, or to ensure the quality of a number of crimp connections made in succession, the force-path curve or force-time curve during a crimp production process is established at very frequent intervals. To this end, the force acting between the two crimping tools is recorded according to the distance between the two tools and is analysed in terms of different target parameters. If the actual curve differs significantly from a target curve, the (defective) crimp connection should be separated out, or parameters of the crimping press should be readjusted, so that proper crimp connections are again produced.

A drawback of known crimping presses is that the drive of a crimping press generally includes a plurality of movable components that are interconnected by different bearings. For example, an eccentric press has a drive shaft with a drive shaft bearing. This drive shaft in turn includes a cam that is mounted in a connecting rod. This acts on the press carriage via a connecting rod bearing, with the press carriage being mounted on either side in a carriage guide.

Considering such arrangements, since the parts may be moved relative to one another, all of these bearings may have play. If the measuring device operates in a highly sensitive manner this leads to disadvantageous consequences when it comes to establishing a representative force-path curve or force-time curve during the crimp production process. It may be understood that the individual bearing surfaces are pressed against one another by the forces effective during the crimp production process. Unfortunately, this occurs in a largely uncontrolled manner, and sometimes even chaotically. This is because the bearing surfaces of the individual bearings are pressed against one another at different times, depending on: the type of bearing, the effective forces, the properties of any lubrication in the bearings, the tools used, the nature of workpieces to be produced, etc. This phenomenon is expressed in the force-path curve or force-time curve by flat areas (changing path or changing time with constant force), or by local minima and discontinuities. The fact that the conditions also change with increasing operating time of a crimping press further complicates the situation, given that the state of lubrication in the bearings may change, or the bearings may become dirtied or worn.

As a result of these unpredictable influences on the force-path curve/force-time curve, caused by the crimping press, these curves may only be employed to draw limited conclusions regarding the quality of a produced crimp connection, and they may lead to conclusions being drawn that are not dependent on the actual crimp. In such circumstances, it is unclear whether a defined force-path curve/force-time curve originates, even if only over portions, from the crimping press as such, or from the workpiece as such. It may be understood that this may be considered extremely unsatisfactory.

According to the prior art, it has therefore been attempted to produce the bearings of a crimping press with as little play as possible, or to adjust them accordingly by precise manufacture of the main individual parts. For example, these bearings include tightenable barrel roller bearings, or cone bearings, or the like. Both possibilities are technically complex and therefore time- and cost-intensive. In addition, they often increase friction and therefore the ease of movement of the press.

It is advantageous to provide an improved crimping press, in particular a crimping press in which the adverse effects, resulting from bearing play, upon the established force-path curves or force-time curves may be reduced.

This advantageous effect is sought by a crimping press of the type mentioned at the outset, additionally including biasing structure applying an initial force between the first and second crimping tools. This biasing structure is oriented in the same direction as the crimping force and is already effectively acting before the crimp production process.

Advantageously, the bearing surfaces of the individual bearings may already lie against one another, in contact, to the greatest possible extent before the crimp production process. Thus, the force-path curve or force-time curve is hardly influenced, or, at best, is not at all influenced by bearing play during the actual crimp production process. Abnormalities in the force-path curve or force-time curve may therefore be associated clearly with the crimp production process to the greatest possible extent. Accordingly, the quality assurance of the crimping presses may therefore be much more reliable than that of known crimping presses. In addition, it has surprisingly been found that, in addition to improved and more expedient measurement results, the actual crimping process is also executed harmoniously, and the quality of the crimping cycle is therefore improved. Therefore, the crimping operation is also better. In addition, not only is the crimp thus improved, but the service life of the tools, bearings and all mechanical components is also improved, since these are therefore looked after. The noise levels produced by the press may also decrease, constituting an additional advantageous effect.

Increased reliability is not achieved by merely using precisely worked or better-adjusted and expensive bearings, but much more favorably by employing biasing structure. In addition, it must be noted that, in any case, the notion of a play-free bearing is contrary to a free movement of the mounted parts and is therefore more or less unattainable. As a practical reality, some specific play in the bearings therefore basically always has to be accepted. The prior art thus pursued the wrong approach by merely providing more precise bearings and better-adjusted bearings, since the fundamental problem primarily cannot in principle be solved in this manner, or may only be solved to a limited extent.

Thus, it is advantageous to have the possibility to construct a press using machine elements of low precision, and to likewise save on adjustment procedures, without having to dispense with the detection of a meaningful force-path curve or force-time curve. Furthermore, the fact that no abnormalities can infiltrate the established force-path curve or force-time curve before the crimp production process is problem-resolving. Achieving a significant effect with low effort is not only cost effective, but also efficient.

By extending a press by the biasing structure, existing presses, in particular presses in which there is play, may also be converted by retrofitting into presses that operate in a precise manner.

Such measures not only positively affect the establishment of a force-path curve or force-time curve, they also influence the production process of a crimp connection in an advantageous manner, given the reduced influence of bearing play.

This result is advantageously independent of the type of drive mechanics of any specific press to the greatest possible extent. Consequently, the invention may therefore be equally useful for crank presses, presses having a camshaft and carriage slide, spindle presses, and toggle mechanisms.

Within the scope of this disclosure and appended claims, the term "drive" should be understood to denote not only a motor as such (that is to say for example an electric rotary motor or a hydraulic linear motor), but also the structure for transferring the motor force onto the crimping tool or tools. The "drive" therefore also includes all types of intermediate shafts, discs, journals, levers, pincers, carriages and the like found in the drivetrain.

Advantageous variants, versions, and developments of the invention shall become clearer from the following description, considered together with the figures of the drawings, as well as the appended claims.

It is particularly advantageous if the initial preload force is of such a strength that bearing surfaces of the drive lie against one another, without play, before the crimp production process. In this variant, all bearing play is eliminated before the actual crimp production process, and therefore the crimp production process, and, in particular, the establishment of a force-path curve or of a force-time curve during the crimp production process, may progress in a manner largely unaffected by bearing play.

It is advantageous if the biasing means are prepared so as to apply the initial force directly to the first and second crimping tools. In this variant, the initial force is applied directly to both crimping tools, thus ensuring that all bearings arranged in the progression of the drive are influenced by the initial force.

It is further advantageous if:

the crimping press includes a machine frame, relative to which the first and/or second crimping tool may be moved; and, the biasing applicator for applying the initial force is prepared between the machine frame and the first and/or second crimping tool.

In this variant of the invention, an initial force is applied between a crimping tool and the machine frame. Depending on the circumstances, this may be easier to implement than application of the initial force directly to both crimping tools. If one of the two crimping tools is arranged idly relative to the machine frame, application of the initial force to the crimping tool movable relative to the machine frame is generally sufficient. If both crimping tools are movable, then an initial force is advantageously applied to both of them.

It may be advantageous if the biasing applicators are formed by at least one spring. Particular nonlimiting examples of springs include a helical spring, a Volute spring, a leaf spring, a disc spring, a gas pressure spring, an elastomer spring and/or a spring made from a fiber composite material. These springs may be of a known per se type, and are established means for applying a force. These biasing structures may therefore be used in practice in a particularly simple technical manner. The aforementioned springs may have different characteristic spring curves and may therefore be adapted particularly effectively to particular requirements according to the invention, for example by a combination of different springs and spring types. Depending on the design of the press, different characteristic spring curves may be advantageous.

Springs may also be divided into pressure springs, torsion springs, flexible springs, draw springs and gas springs. All types may, in principle, be used to achieve the advantageous results, wherein pressure springs, draw springs and gas springs are particularly suitable due to the generally linear movement of the tools. Gas springs may also be adapted particularly effectively to a required spring force by applying more or less pressure to the gas spring. Elastomer springs offer high mechanical load-bearing capacity in addition to excellent damping properties as well as good resistance to many chemicals and oils. Due to their generally smooth surfaces, they are also less susceptible to dirtying and are easy to clean. At this juncture, it may be also be noted that, within the scope of the present disclosure and claims, the terms "elastomer(ic) springs" are also to be understood to include springs made of silicone.

It may also be advantageous to form the biasing structure by at least one actuator, in particular by a pneumatic cylinder, a hydraulic cylinder, or a piezo element. Instead of a spring or possibly in addition thereto, an initial force may also be applied in principle by an actuator, for example by a pneumatic cylinder. Corresponding pressure is applied to this actuator before the crimp production process. Since variable pressure may also be applied to a gas spring, in this view, any dividing boundaries between gas springs and pneumatic cylinders are hazy. Actuators may advantageously also be relieved completely where necessary, and thus may be advantageous in particular when changing a tool or when performing other maintenance tasks on a crimping press.

It may be advantageous to form the biasing structures as adjustable, in particular if they are adjustable manually or automatically. The biasing structure may thus be adapted optimally to a crimping process. In particular, aging effects of the crimping press (for example dirtied bearings, altered viscosity of lubricating grease) and temperature influences may therefore also be effectively compensated for. In particular, it is also conceivable for such adjustments to be made automatically. For example, a biasing force may be adjusted according to an ambient temperature.

A crimping press may additionally advantageously comprise:

sensor or sensors for detecting whether bearing surfaces of the drive lie against one another without play during the crimp production process, and adjuster apparatus for adjusting the biasing structures after a negative result of detection, so that the bearing surfaces come to lie against one another, in contact without play during the crimp production process.

In this variant, a control loop is formed by the detectors and the adjuster. If it is found that the initial force is not sufficient to eliminate the bearing play as desired, the force is increased accordingly. Similarly, the biasing force may be decreased if it is found that even a relatively low biasing force is sufficient to reduce the bearing play as desired. In particular, it is thus possible to prevent an unnecessarily high initial force from being applied to the crimping press, in particular the drive thereof. To measure whether the bearing surfaces lie against one another, corresponding pressure sensors or strain gages may be provided in the region of the bearings so as to indicate a transfer of force over the bearing surfaces as they contact against one another.

It is also particularly advantageous if:

the crimping press includes circuitry for detecting the force applied between the first and second crimping tools according to: a) the distance between the first and second crimping tools, and/or, b) time; and, the detection circuitry examine a force-path curve and/or force-time curve recorded during the crimp production process in terms of a curve originating from a bearing play in the drive.

In this variant, the force-path curve or force-time curve during the crimp production process is directly employed to detect an abnormality originating from bearing play that has not been sufficiently eliminated. For example, these abnormalities are present in the form of flat portions or discontinuities in the force-path curve or force-time curve. In this variant, sensor or sensors for detecting bearing play are also utilised and are generally provided in any case in a crimping press, namely for the force-path curve or force-time curve so as to determine the quality of a crimp connection. The function of the established force-path curve or force-time curve may therefore be twofold.

Lastly, it may be particularly advantageous if the crimping press includes:

at least one sensor for detecting the force applied between the first and second crimping tools, and, adjusting arrangement for decreasing the initial force during the crimp production process.

It is thus possible to prevent the crimping press, in particular the drive thereof, from being loaded excessively by the initial force. Specifically, if the force applied between the first and second tools increases due to the crimp production process (that is to say when the crimp contact is pressed onto a wire or a cable), the initial force is then decreased so as to reduce the overall load on the press. The overall force is advantageously kept substantially constant, at least in some regions. By subtracting the initial force from the total force, it is possible to back-calculate the actual crimping force. All adjustable actuators, for example a pneumatic or hydraulic cylinder with adjustable pressure, are suitable for adjustment of the initial force.

Versions, variants, and developments of the invention as described herein may be combined in any way, as shall be understood by readers skilled in the art. Reference in this specification to "one/an embodiment," "one/a version," and "a/one variant," should be understood to mean that a particular feature, structure, or characteristic described in connection with the version, variant, or embodiment is included in at least one such version, variant, or embodiment of the disclosure. The appearances of phrases "in a/one version," "in a/one variant," "in a/one embodiment," and the like in various places in the specification are not necessarily all referring to the same variant, version, or embodiment, nor are separate or alternative versions, variants or embodiments mutually exclusive of other versions, variants, or embodiments. Moreover, various features are described which may be exhibited by some versions, variants, or embodiments and not by others. Similarly, various requirements are described which may be requirements for some versions, variants, or embodiments but not others. Furthermore, as used throughout this specification, the terms 'a', 'an', 'at least' do not necessarily denote a limitation of quantity, but rather denote the presence of at least one of the referenced item, and the term 'a plurality' denotes the presence of more than one referenced items. As a further aid to reading, it should be noted that the terms "connected" or "coupled" and related terms are used in an operational sense and are not necessarily limited to either a direct or physical connection or coupling.

In this light, aspects of the present invention shall now be explained in greater detail with reference to the exemplary versions and variants depicted in the appended figures of drawings, in which:

In the figures of the drawing, like and functionally like elements and features are denoted by like reference labels, unless indicated otherwise.

FIG. 1 shows a first exemplary force-time curve during a crimp production process. In the illustrated graph the force F, which acts between the two crimping tools, is plotted over time t, which elapses as the first crimping tool moves relative to the second crimping tool.

It may be seen that the force F increases relatively sharply from a certain point, namely when both crimping tools lie against the workpiece. After a maximum force however, the force F falls again sharply, namely when the crimping tools are moved away from one another again. This is a typical force-time curve during a crimp production process. Of course, the force-time curve may deviate considerably in practice, for example if different types of contacts are pressed onto a wire.

Figure 1:
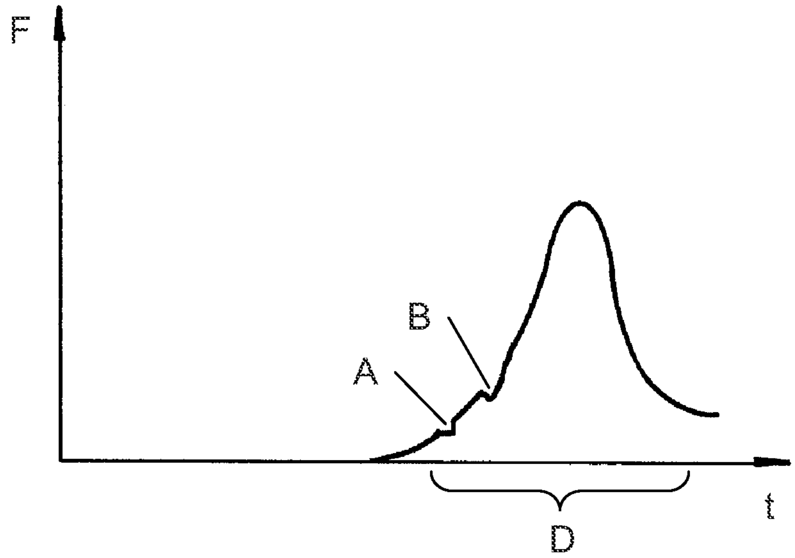
Fig. 1 (prior art)
FIG. 1 shows a force-time curve when crimping according to the prior art.

Considering the FIG. 1 illustrated force-time curve, a flat portion A and a local minimum B can be seen. Both therefore originate from the fact that the bearing surfaces of two bearings come to lie against one another at different times, that is to say at different forces F. In the region A this occurs at constant force, and in region B at decreasing force F. In region B, the bearing surfaces "snap" together so to speak.

To assess the crimp production process, merely the central portion of the force-time curve is generally used. This is because the forces at the start and end of the crimp production process are widely spread, and therefore are only of little value for the assessment of the quality of a crimp connection. In the present example, this central portion is indicated by reference label D.

However, in this example, this portion D of the force-time curve that is actually provided to determine the quality of a crimp connection, has two portions A, B, which are not caused by the crimp production process as such, but by bearing play. As may be observed, this impairs the assessment of the quality of a crimp connection considerably. In some circumstances, the bearing play may even result in the force-time-curve leaving an admissible tolerance band in the regions A and B and in the crimp connection therefore being mistakenly qualified as unusable.

Figure 2:
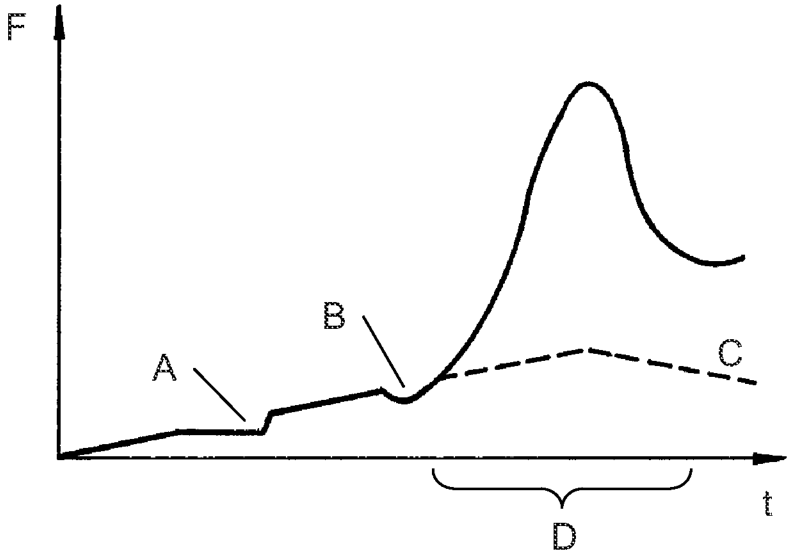
FIG. 2 shows a force-time curve when crimping with superimposed initial force imposed by a spring of linear characteristic curve.

FIG. 2 shows the same situation as in FIG. 1, but in this example an initial force is applied in following the invention, between the first and second crimping tools. This initial force is oriented in the same direction as the crimping force F and is already effective/acting before the crimp production process. In the present case, this force is exerted by a spring having a linear characteristic curve C. It should be noted that since the crimping tools move away from one another after the maximum force F, the characteristic spring curve C falls again from this point.

In FIG. 2 the discontinuities in the force-time curve in regions A and B lie far before the actual crimp production process. In particular, this means that the bearing surfaces of the bearing, which cause the flat portion A, are driven towards one another long before the crimp production process. The portion D of the force-time curve, which characterises the crimp production process, is unaffected by bearing play and may therefore be used directly to assess the quality of a crimp connection.

As can also be seen from FIG. 2, it is often sufficient to keep the portion D free from abnormalities which originate from bearing play. It may not be absolutely necessary to keep the entire crimp production process free from abnormalities caused by bearing play.

Figure 3:
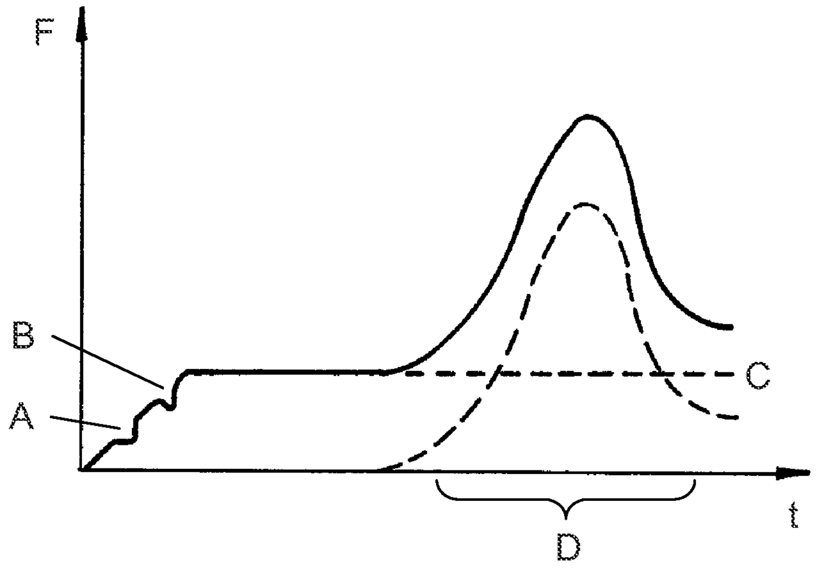
FIG. 3 shows a force-time curve when crimping with superimposed initial force imposed by a spring of declining characteristic curve.

FIG. 3 shows a similar situation as in FIG. 2, but with a changed characteristic spring curve C. In this example force initially rises sharply but then continues horizontally. For example, such a characteristic spring curve C may be produced or approximated by a gas pressure spring that has a pressure relief valve. The pressure inside the gas pressure spring and therefore the externally effective force initially rise sharply, but then remain at a constant level when the pressure relief valve is opened. By adjusting a matching opening pressure, the characteristic spring curve C may be effectively be adapted for different requirements. Of course, other types of springs having a decreasing characteristic spring curve may also be used equally.

As can be easily observed, the bearing surfaces come to lie against one another even earlier still, and therefore the regions A and B in the graph shown in FIG. 3 lie even further to the left. The portion D of the force-time curve that characterises the crimping process, is completely unaffected by bearing play. The quality of a crimp connection may be assessed with even greater improvement.

Figure 4:
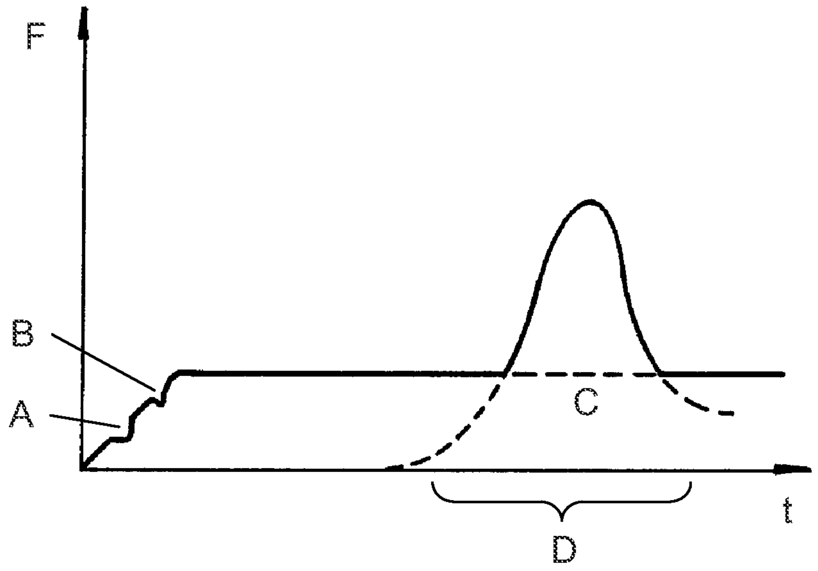
FIG. 4 shows a force-time curve when crimping with superimposed initial force imposed by an actuator.

FIG. 4 shows a similar situation as in FIG. 3, but the initial force is influenced actively in this example by an actuator. The force F increases sharply initially and then remains constant, as in FIG. 3. In contrast to the case shown in FIG. 3, it also remains constant at the start of the crimp production process however (see FIG. 3 dashed characteristic curve). This is caused by the fact that the total force F is measured and the initial force is reduced to such an extent that the total force F remains at a constant level. The total force F is thus controlled. If it increases due to the starting crimp production process, the initial force is decreased accordingly.

At the point at which the total force F is higher than the initial force due to the crimp production process, the force F can no longer be kept constant and rises as in the above examples because a further decrease in the initial force is no longer possible (unless the actuator for applying the initial force can also apply it in the reverse direction). In this region, the force-time curve therefore resembles the force-time curve from FIG. 1. If, however, the force F falls again below the set level for the initial force, the initial force is then increased again proportionally so that a horizontal portion in the force-time curve is again provided at the end of the crimp production process.

By measuring the currently applied initial force, this can be subtracted from the force-time curve illustrated by the solid line in FIG. 4 so that the force-time curve may be reconstructed without initial force. The resultant force-time curve during the crimp production process (illustrated by a dashed line in this case) therefore resembles the curve illustrated in FIG. 1, but without the regions A and B originating from the bearing play, which lie very far to the left in the graph, as before, and therefore are very far from the crimp production process.

An advantage of this variant of the invention is that the maximum force in the force-time curve does not lie above the level without initial force shown in FIG. 1, in spite of application of an initial force. The crimping press thus is not loaded to a greater extent by the initial force, in contrast to the cases illustrated in FIGS. 2 and 3.

For example, pneumatic or hydraulic cylinders in which the pressure may be controlled actively are possible actuators for the variant of the invention illustrated in FIG. 4. Of course, other actuators suitable for application of an adjustable initial force may also be used employed.

It is also advantageous to detect whether bearing surfaces of the drive lie against one another without play during the crimp production process. If this is not the case, for example because abnormalities, such as flattened portions A and local minima B, have been detected in the force-time curve, the biasing structure or the initial force is/are adjusted in such a way that the bearing surfaces come to lie against one another without play during the crimp production process and therefore there are no longer any abnormalities. The initial force is advantageously of such a strength that no abnormalities at all can be determined.

Figure 5:
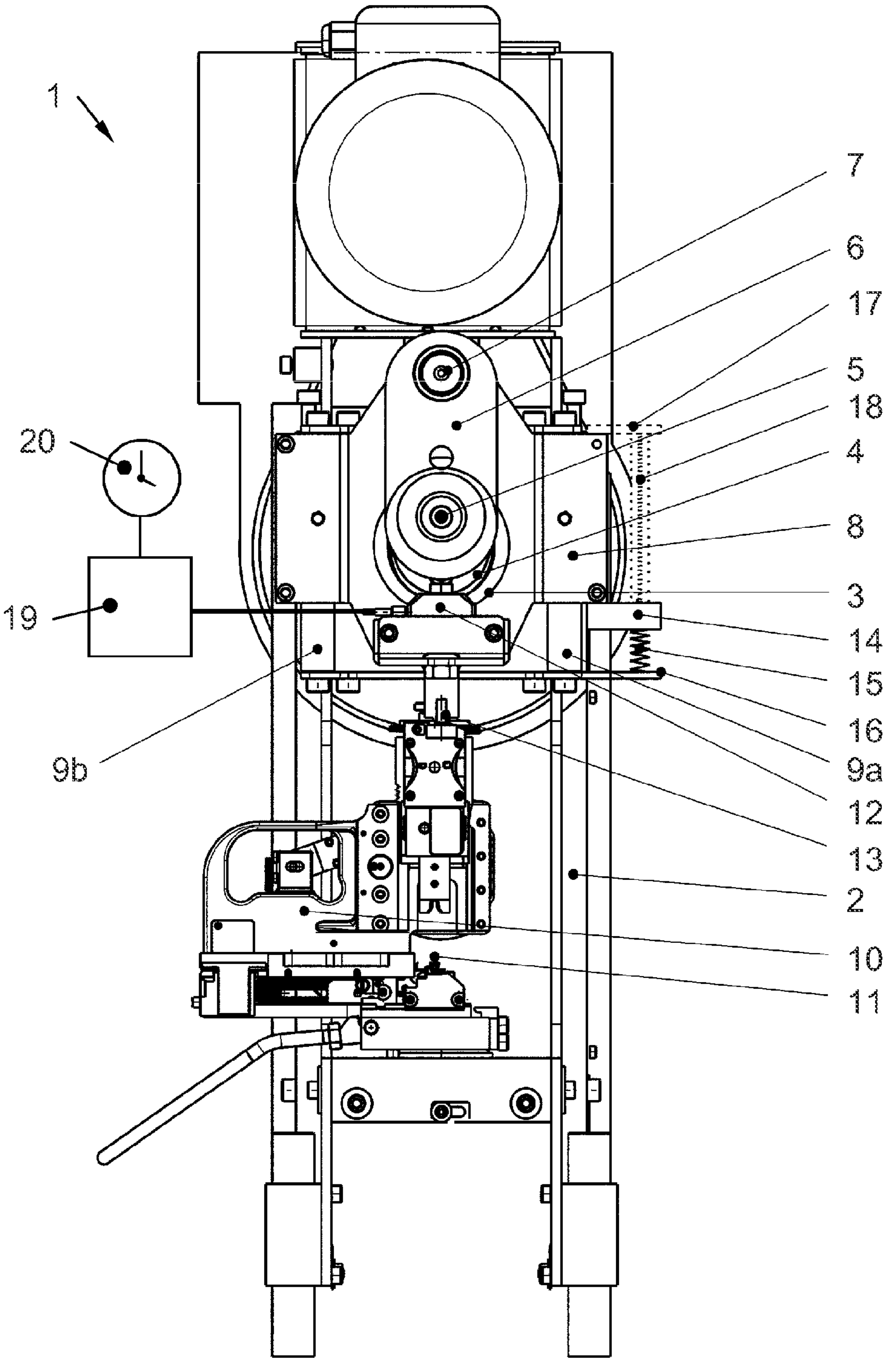
FIG. 5 depicts an exemplary crimping press with biasing springs according to the invention.

FIG. 5 depicts a variant of a crimping press 1 according to the invention. The crimping press 1 comprises a machine frame 2, a drive shaft 4 mounted in a drive shaft bearing 3, a cam 5 connected to the drive shaft 4 and a connecting rod 6, which is connected to the cam 5 and which is connected via a connecting rod bearing 7 to a press carriage 8. The press carriage 8 is mounted displaceably in the carriage guides 9*a* and 9*b*.

A crimping device 10, which includes a first crimping tool 11, is also connected to the machine frame 2. In this example, the first crimping tool 11 is arranged fixedly relative to the machine frame 2. This is in no way obligatory, however. Rather, the first crimping tool 11 may also be movably mounted relative to the machine frame 2.

The press carriage 8 is also connected via a flexural beam, on which a crimping force sensor 12 is arranged, to a second crimping tool 13, which may thus be moved relative to the machine frame 2.

Moreover, the crimping press 1 comprises a holder 14 on the carriage side, a holder 16 fixed to the frame, and a resilient element 15 arranged between the holder 14 on the carriage side and the holder 16 fixed to the frame. Finally, the crimping press 1 comprises an electronic circuit 19 connected to the force sensor 12, and a timer 20 connected to the electronic circuit 19. In this example, the force sensor 12, in combination with the electronic (evaluation) circuit 19, detect the force F applied between the first and second crimping tools 11, 13.

The crimping press 1 illustrated in FIG. 5 functions as follows:

The cam 5 is moved via the drive shaft 4 and transfers the driving force onto the press carriage 8 via the connecting rod 6. During the crimp production process, the press carriage 8 moves downwards so that the two crimping tools 11 and 13 are driven towards one another. The force present between the crimping tools 11 and 13 is measured continuously with the aid of the crimping force sensor 12. By the electronic circuit 19 and the timer 20 (which may also be integrated in the electronic circuit 19) a force-time curve may be acquired. Consequently, the force sensor 12 and the timer 20 (in particular in combination with the electronic circuit 19) represent detection apparatus designed to acquire a force-time curve during the crimp production process. Such a force-time curve may be recorded and stored in a memory in the electronic circuit 19 for further use and/or examination.

An initial force is then applied between the first and second crimping tools 11,13 by the resilient element 15 and is already effective before the crimp production process. This initial force causes the bearing surfaces of the bearings in the drivetrain to contact against one another. In the present case, this concerns for example the bearing between the cam 5 and the connecting rod 6, and the bearing between the connecting rod 6 and the press carriage 8.

If the second crimping tool 13 then ultimately contacts a workpiece (not illustrated) as the press carriage 8 is moved further down, any bearing play is thus eliminated insofar as it only has a much weaker effect on the force measurement during the actual crimp production process or no longer affects it at all.

Alternatively or in addition to the pressurised resilient element 15, a resilient element 18 may also be provided, which is arranged between a holder 17 fixed to the frame and the holder 14 on the carriage side and is tensioned.

For example, a helical spring, a Volute spring, a leaf spring, a disc spring, a gas pressure spring, an elastomer soring or a spring made of a fibre composite material may be provided as a resilient element 15 or 18 to produce a force-time curve as illustrated for example in FIGS. 2 and 3.

Actuators may also be provided instead of the resilient elements 15 or 18 (or additionally thereto). For example, a pneumatic cylinder in which the pressure may be actively controlled may be provided between the holder 14 on the carriage side and the holder 16 fixed to the frame so as to produce a force-time curve as illustrated for example in FIG. 4.

Figure 6:
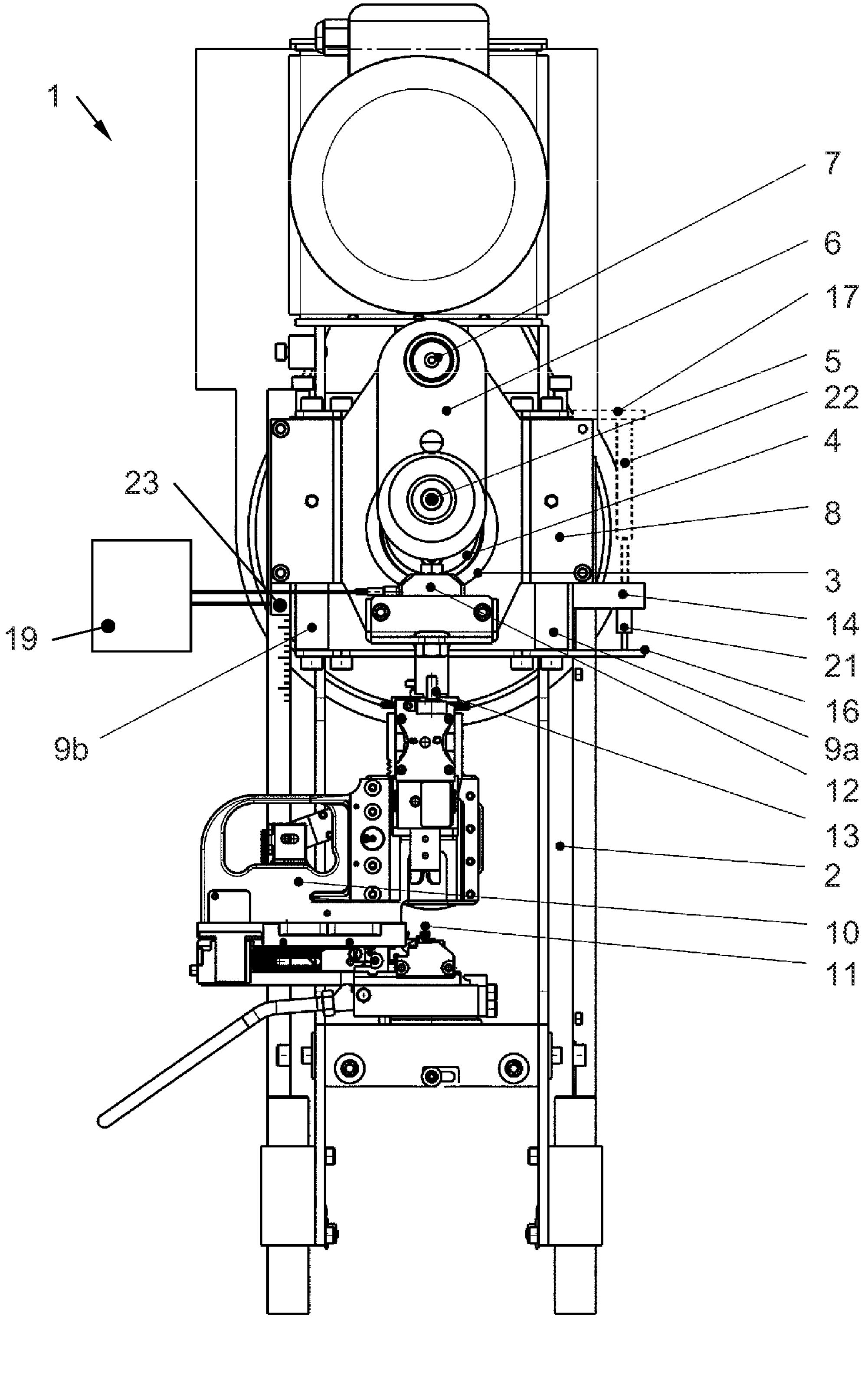
FIG. 6 depicts an exemplary crimping press with biasing actuators according to the invention.

FIG. 6 depicts an exemplary crimping press 1, which is quite similar to the crimping press 1 of FIG. 5. In contrast, a pneumatic/hydraulic cylinder 21 instead of the resilient element 15 is provided between the holders 14 and 16. The pneumatic/hydraulic cylinder 21 is designed to apply a pressure force between the holders 14 and 16. However, in lieu thereof, or additionally, a pneumatic/hydraulic cylinder 22 (shown with dashed lines) may be provided between the holders 14 and 17 and apply a tension force between these holders 14 and 17. By variation of the pressure which is put on the pneumatic/hydraulic cylinder 22, the biasing force may easily be adjusted. Thus, a pneumatic/hydraulic cylinder 22 may act both as biasing structure and bias adjusting structure.

Furthermore, the pneumatic/hydraulic cylinder 21, 22 may be used as means to decrease an initial biasing force, in particular during crimping. It is thus possible to prevent the crimping press 1, in particular the drive 3 . . . 8 thereof, from being loaded excessively by the initial force. In this case, the initial force is decreased so as to reduce the overall load on the press 1. The overall force is advantageously kept substantially constant, for example as was explained in relation to FIG. 4.

A further difference relates to the acquisition of a force graph. A path/length (displacement) measuring device 23 is provided instead of a timer 20 in this example. Accordingly, the electronic circuit 19 acquires a force-path-curve instead of a force-time curve. Consequently, the force sensor 12 and the length measuring device 23 (in particular in combination with the electronic circuit 19) represent a detector designed to acquire a force-path curve during the crimp production process. Such a force-path curve may be recorded and stored in a memory in the electronic circuit 19 for further use and/or examination.

Alternatively, it is also conceivable for resilient elements or actuators to be arranged at a location other than as illustrated. For example, these may be arranged directly between the first and second crimping tools 11 and 13. Of course, a plurality of biasing structures may also be arranged on the press 1, for example between the connecting rod 6 and the cam 5 as well as between the connecting rod 6 and the press carriage 8. In this regard, many possible implementation variants of the inventive principle, in terms of construction, are made evident for a reader skilled in the art, however.

Figure 7:
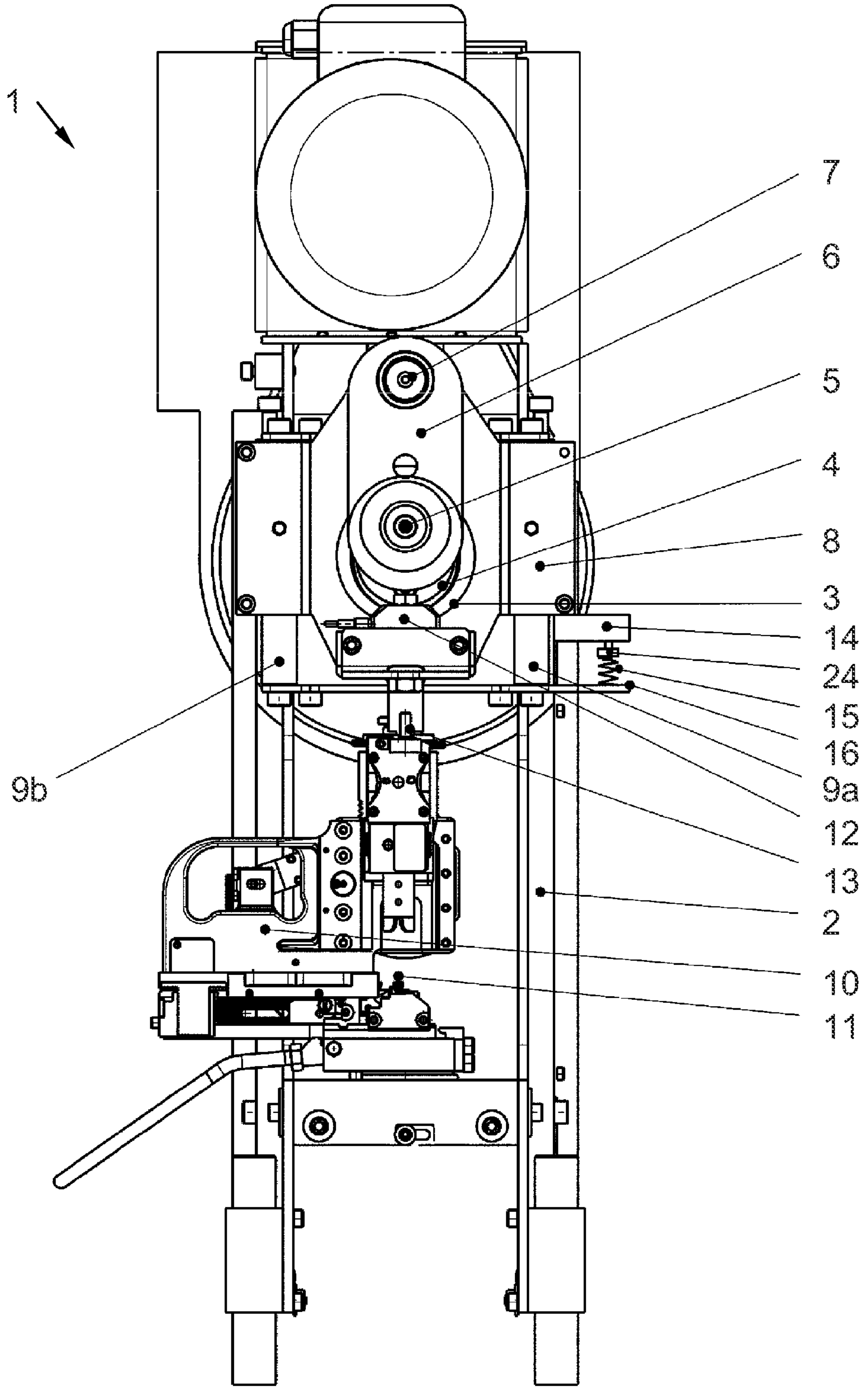
FIG. 7 depicts an exemplary crimping press with a screw to adjust the biasing force according to the invention.

Turning to FIG. 7, it depicts a crimping press 1 with an adjuster for the biasing force produced by the deformation of spring 15. The adjusting screw 24 is provided with an adjuster of the biasing force.

Figure 8:
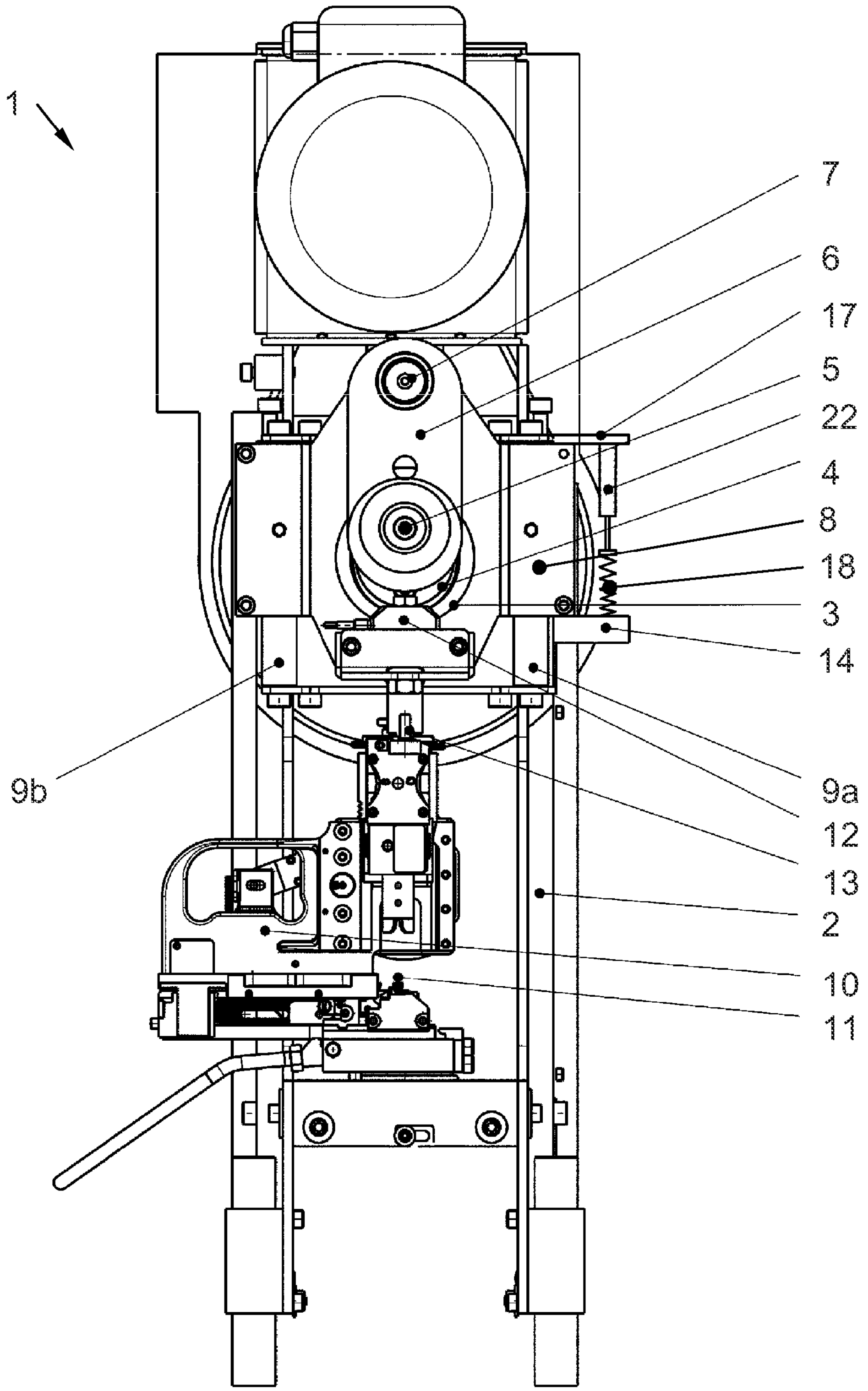
FIG. 8 depicts an exemplary crimping press with a biasing spring-actuator-combination according to the invention and FIG. 9 depicts a connecting rod of a crimping press in detail.

For example, also the teaching from FIGS. 2 and 4 may be combined by combining a spring 18 with an actuator 22 (e.g. again a pneumatic/hydraulic cylinder 22), this being depicted in FIG. 8. Such an arrangement may be especially useful, when employing hydraulic cylinders 22 that do not provide a spring constant by nature as pneumatic cylinders do. For example, the pistons of such hydraulic cylinders 22 may be set to a dedicated position for a desired spring constant, and this position may be maintained constant for a longer period of time, e.g. several crimping cycles.

Figure 9:
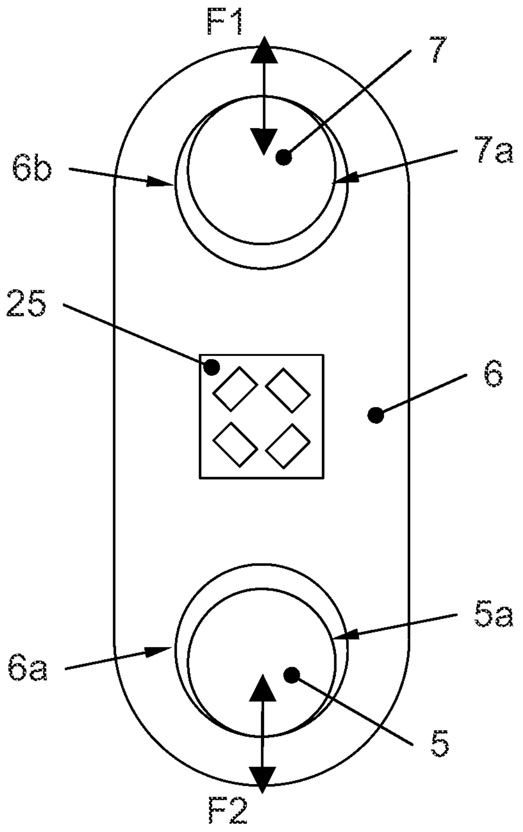

Finally, FIG. 9 depicts a connecting rod 6 of a crimping press 1 in detail. For reasons of better visibility the bearing play between the connecting rod 6, the cam 5 and the connecting rod bearing 7 is depicted in exaggerated extent. In the example of FIG. 9, there is depicted a state, in which the crimping press 1 is biased, respectively in a state, in which a crimping force is applied. Accordingly the bearing surfaces 5*a*, 6*a*, 6*b* and 7*a* are in contact in their upper respectively lower regions. Hence, a tension force is applied to the connecting rod 6, which in this example may be measured by a strain gage 25. This strain gage 25 may be used to detect whether the bearing surfaces of the drive 3 . . . 8 lie against one another without play. If there is no tension (or pressure) force or just a low force, the bearing surfaces 5*a*, 6*a*, 6*b* and 7*a* may be considered as being not in contact, or as being just in loose contact. Accordingly, a biasing force may be applied or increased until the bearing surfaces of the drive 3 . . . 8 lie against one another without play, meaning until the bearing forces F1, F2 are sufficiently high. Thus, it is possible to prevent an unnecessarily high initial force from being applied to the crimping press 1, and in particular the drive 3 . . . 8 thereof. It should also be noted that the strain gauge 25 may be connected to the electronic circuit 19 to process the measured force. It should also be noted that the same considerations may be made with respect to backlash (e.g. in a gear box of the crimping press 1).

A further possibility to ensure that the bearing surfaces of the drive 3 . . . 8 lie against one another without play is to use the force-time curve and/or force-path curve acquired by the force sensor 12 and the timer 20, or, respectively, the length measuring device 23. The electronic circuit 12 may examine the force-time curve and/or force-path curve with respect to anomalies A, B, and raise a biasing force by controlling a pneumatic/hydraulic cylinder 21, 22 or other adjuster (e.g. the adjusting screw 24) until the anomalies A, B are (just) out of the portion D for determining quality, that is, the region D in which crimping is performed. Similarly, the electronic circuit 12 may be used to lower a biasing force until anomalies A, B are just out the portion for determining quality D. In this way bearing play as well as excessive biasing forces may be avoided.

In summary, bearing play/backlash as well as excessive biasing forces may be avoided by keeping a force measured by the strain gauge 25 in a region >0 or by evaluation of a force-time curve and/or force-path curve and keeping anomalies A, B (just) out of the portion for determining quality D. Of course, both techniques may be combined, and, of course, bearing forces may be measured in other ways (e.g., by piezo pressure sensors), or on other or additional parts of the crimping press 1. For example, the current supplied to a motor of the crimping press 1 may be measured and used for the decision whether there is bearing play and/or backlash or not. If the current is sufficiently high (just) before entering the portion for determining quality D, the bearing play and/or backlash may be considered as being removed.

In closing, it is noted that as force-progression curves, force-path curves may equally be utilised for the invention instead of force-time curves such as those illustrated in FIGS. 1 to 4. The depicted exemplary variants of the crimping press 1 also constitute merely a fraction of the many possibilities and should not be considered as limiting to the field of application of the invention. Further, the illustrated variants may be combined and modified as desired. In addition, it is noted that parts of the devices illustrated in the figures may also form the basis of independent inventions. Thus, in closing, it should be noted that the invention is not limited to the abovementioned versions and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not necessarily limiting upon the scope of the present invention. The scope of the present invention is defined by the appended claims, including known equivalents and unforeseeable equivalents at the time of filing of this application.

LIST OF REFERENCE LABELS

A flat portion
B local minimum
C characteristic spring curve
D portion for determining quality
F force
F1, F2 bearing force
t time
1 crimping press
2 machine frame
3 drive shaft bearing
4 drive shaft
5 cam
5*a* bearing surface on cam
6 connecting rod
6*a*, 6*b* bearing surface on connecting rod
7 connecting rod bearing
7*a* bearing surface on connecting rod bearing
8 press carriage
9*a*, 9*b* carriage guide
10 crimping device
11 first crimping tool
12 crimping force sensor
13 second crimping tool
14 holder on the carriage side
15 resilient element for pressure mode
16 holder fixed to the frame for pressure mode
17 holder fixed to the frame for tension mode
18 resilient element for tension mode
19 electronic circuit
20 timer
21 pneumatic/hydraulic cylinder for pressure mode
22 pneumatic/hydraulic cylinder for tension mode
23 length measuring device
24 adjusting screw
25 strain gauge

What is claimed is:

1. A crimping press comprising:

a machine frame;

a drive shaft, said drive shaft being mounted in a drive shaft bearing;

a cam connected to said drive shaft;

a connecting rod operatively connected to said cam, said connecting rod being operatively connected to said cam at a first location on said connecting rod;

a press carriage, said connecting rod being operatively connected to said press carriage via a connecting rod bearing, said connecting rod being operatively connected to said press carriage at a second location on said connecting rod;

at least one carriage guide connected to said machine frame, said press carriage being mounted on said at least one carriage guide;

a first crimping tool mounted on said machine frame;

a flexural beam connected to said press carriage;

a second crimping tool connected to said press carriage via said flexural beam;

a first bias applicator holder connected to said press carriage;

a second bias applicator holder connected to said machine frame; and a bias applicator configured to apply a prebiasing initial force acting at least codirectionally to the crimping force reaction separatory to said first and second crimping tools prior to crimping engagement of said first and second crimping tools, said bias applicator being situated between said first and second bias applicator holders.

2. A crimping press as claimed in claim 1 further comprising:

said bias applicator includes a spring; and said spring is tensioned to pull said first bias applicator holder towards said second bias applicator holder.

3. A crimping press as claimed in claim 1 further comprising:

said bias applicator includes a first spring; and said first spring is compressed to push said first bias applicator holder away from said second bias applicator holder.

4. A crimping press as claimed in claim 3 further comprising:

a third bias applicator holder connected to said machine frame; and a second spring between said first and third bias applicator holders, said second spring being tensioned to pull said first bias applicator holder towards said third bias applicator holder.

5. A crimping press as claimed in claim 1 further comprising:

a spring;

a spring adjuster for adjusting the prebiasing initial force of said spring; and said bias applicator includes said spring.

6. A crimping press as claimed in claim 1 further comprising:

said bias applicator includes an actuator, said actuator is situated to pull said first bias applicator holder towards said second bias applicator holder.

7. A crimping press as claimed in claim 1 further comprising:

said bias applicator includes a first actuator, said first actuator is situated to push said first bias applicator holder away from said second bias applicator holder.

8. A crimping press as claimed in claim 7 further comprising:

a third bias applicator holder connected to said machine frame; and a second actuator between said first and third bias applicator holders, said second actuator situated to pull said first bias applicator holder towards said third bias applicator holder.

9. A crimping press as claimed in claim 1 further comprising:

said bias applicator includes a spring, and said bias applicator includes an actuator.

* * * * *